United States Patent [19]
Lloyd

[11] Patent Number: 4,916,339
[45] Date of Patent: Apr. 10, 1990

[54] SIGNAL PROCESSING FOR CONTACT-SENSING PROBE

[75] Inventor: Peter G. Lloyd, Bristol, United Kingdom

[73] Assignee: Renishaw plc, United Kingdom

[21] Appl. No.: 191,165

[22] PCT Filed: Sep. 2, 1987

[86] PCT No.: PCT/GB87/00610
§ 371 Date: Apr. 26, 1988
§ 102(e) Date: Apr. 26, 1988

[87] PCT Pub. No.: WO88/01726
PCT Pub. Date: Mar. 10, 1988

[30] Foreign Application Priority Data

Sep. 3, 1986 [GB] United Kingdom .................. 8621243
Dec. 24, 1986 [GB] United Kingdom .................. 8630836

[51] Int. Cl.$^4$ .............................. H03K 5/26; H03K 5/22; H03K 3/00; H03K 3/033
[52] U.S. Cl. .............................. 307/518; 307/542.1; 307/514; 307/520; 307/527
[58] Field of Search ...................... 307/542.1, 514, 544, 307/518, 520, 527, 525, 475, 443, 630, 590, 599, 296.1; 377/24; 328/133

[56] References Cited

U.S. PATENT DOCUMENTS

| | | | |
|---|---|---|---|
| 3,790,761 | 2/1974 | Crabtree | 377/24 X |
| 4,023,045 | 5/1977 | Migliardi et al. | 307/119 |
| 4,115,923 | 9/1978 | Smith et al. | 33/172 E |
| 4,153,998 | 5/1979 | McMurtry | 33/174 L |
| 4,177,568 | 12/1979 | Werner et al. | 33/174 L |
| 4,185,210 | 1/1980 | Zuk | 307/542.1 X |
| 4,270,275 | 6/1981 | McMurtry | 33/174 L |
| 4,301,338 | 11/1981 | McMurtry | 200/61.41 |
| 4,339,714 | 7/1982 | Ellis | 324/107 |
| 4,398,105 | 8/1983 | Keller | 307/514 X |
| 4,403,193 | 9/1983 | Takemura | 307/542.1 X |
| 4,443,946 | 4/1984 | McMurtry | 33/174 L |
| 4,451,988 | 6/1984 | McMurtry | 33/174 L |
| 4,455,755 | 6/1984 | Fritsche et al. | 33/174 L |
| 4,462,162 | 7/1984 | McMurtry | 33/174 L |
| 4,502,014 | 2/1985 | Bismarck | 307/518 X |
| 4,578,873 | 4/1986 | Klinger et al. | 33/559 |
| 4,620,118 | 10/1986 | Barber | 307/514 X |
| 4,626,708 | 12/1986 | Cooper | 307/542.1 X |
| 4,702,013 | 10/1987 | McMurtry | 33/558 |
| 4,761,566 | 8/1988 | Inoue et al. | 307/542.1 X |

FOREIGN PATENT DOCUMENTS

| | | |
|---|---|---|
| 0068899 | 5/1985 | European Pat. Off. . |
| 2551361 | 6/1976 | Fed. Rep. of Germany . |
| 2820813 | 11/1979 | Fed. Rep. of Germany . |
| 2841548 | 4/1980 | Fed. Rep. of Germany . |
| 3210711 | 2/1984 | Fed. Rep. of Germany . |
| 2321681 | 3/1977 | France . |
| 2430622 | 7/1979 | France . |
| 8603829 | 3/1979 | PCT Int'l Appl. . |
| 8504706 | 10/1985 | PCT Int'l Appl. . |
| 2049198 | 5/1979 | United Kingdom . |
| 1586052 | 6/1979 | United Kingdom . |
| 2025073 | 1/1980 | United Kingdom . |

*Primary Examiner*—Andrew J. James
*Assistant Examiner*—David R. Bertelson
*Attorney, Agent, or Firm*—Oliff & Berridge

[57] ABSTRACT

A probe (12) is connected to an interface circuit (10). The probe (12) has two different types of contact sensors, namely a piezo electric sensor and an electromechanical switching sensor. The trigger signal from the piezo electric sensor is detected by circuits (34,36,38,40) while that from the switching sensor is detected by a comparator (32). The signals are mixed in a mixer (42) to produce a single output trigger signal. A monostable (48) and latch (50) discriminate which sensor produced the output signal, making use of the inherent time delay between the two sensor signals. Circuits (24,26,28) determine if a conventional switching probe has been connected instead of the probe (12). If so, a transistor (T4) varies the power supply to the probe, and gates (30,33) switch in a comparator (18) in place of the comparator (32).

12 Claims, 2 Drawing Sheets

SIGNAL PROCESSING FOR CONTACT-SENSING PROBE

BACKGROUND OF THE INVENTION

This invention relates to probes for sensing the position of a workpiece, e.g. by contact, for use in apparatus such as co-ordinate measuring machines and machine tools, for measuring the dimensions of work-pieces. More particularly, it relates to circuits for processing and conditioning the signals received from such probes.

Our European Patent Application No. 87105192.6, U.S. Pat. Application Ser. No. 07/036,475 and Japanese Patent Application No. 91,112/1987, which are co-pending with the present application and claim a common priority therewith, and which are incorporated herein by reference, describe a probe having a stylus for contacting the workpiece. The probe is fitted in apparatus which causes relative movement of the probe and workpiece, and the probe contains two different means for sensing when such contact is made. One sensing means is a piezo-electric sensor, which detects a sharp acceleration or shock transmitted into the stylus on its initial contact with the workpiece, and gives a practically instantaneous indication of this contact. The other sensing means relies on conventional electro-mechanical switching between a movable member to which the stylus is connected, and a fixed member or housing. This switching occurs between confronting seat elements of a kinematic support for the movable member on the fixed member, which may comprise a cylinder seating on a pair of balls at each of three locations spaced around the axis of the stylus. The purpose of this switching is to indicate seating and reseating of the movable member. It also provides a useful back-up signal to indicate contact with the workpiece if the piezo-electric sensor fails to provide a signal on initial contact (e.g. if the contact is made at a very low speed). This back-up signal provides a (less accurate) measurement indication, and also serves to stop the apparatus to prevent collision damage between the workpiece and the probe.

The two signals from the two sensing means are combined to give a single trigger signal, which is taken to the apparatus to indicate that contact has occurred. The apparatus therefore only has to deal with one trigger signal, as with a conventional probe. To give maximum interchangeability between conventional probes and such probes with two sensing means, the above co-pending applications describe circuits for combining the two signals within the probe itself, prior to transmission to an external interface unit which interfaces the probe to the apparatus. However, it would of course be possible to combine the signals in the interface unit if maximum interchangeability is not essential.

However, while it is advantageous to provide the apparatus with a single combined trigger signal in the above manner, the apparatus has no way of knowing whether the trigger signal resulted from the accurate sensing of the initial contact provided by the piezo-electric sensor, or from the less accurate switching sensor.

SUMMARY OF THE INVENTION

The present invention, at least in one aspect, provides a circuit for processing a trigger signal from a workpiece position-sensing probe having first and second sensing means for producing said trigger signal, the circuit comprising:
    first detecting means for detecting a signal produced by the first sensing means, giving a first detection signal;
    second detecting means for detecting a signal produced by the second sensing means, giving a second detection signal;
    means for combining the first and second detection signals and producing an output trigger signal in response to whichever of said detection signals is the first to occur; and
    means for discriminating which of said first and second detection signals produced the output trigger signal, and providing a further output accordingly.

Provision of the further output to the apparatus enables the apparatus to take corrective action if the more accurate sensor fails to provide the initial contact signal, e.g. by repeating the measurement.

The discriminating means may act by discriminating a time delay between the detection signals.

BRIEF DESCRIPTION OF THE DRAWINGS

Examples of the invention will be described with reference to the accompanying drawings, in which.

DESCRIPTION OF THE PREFERRED EMBODIMENTS

Figure 1:
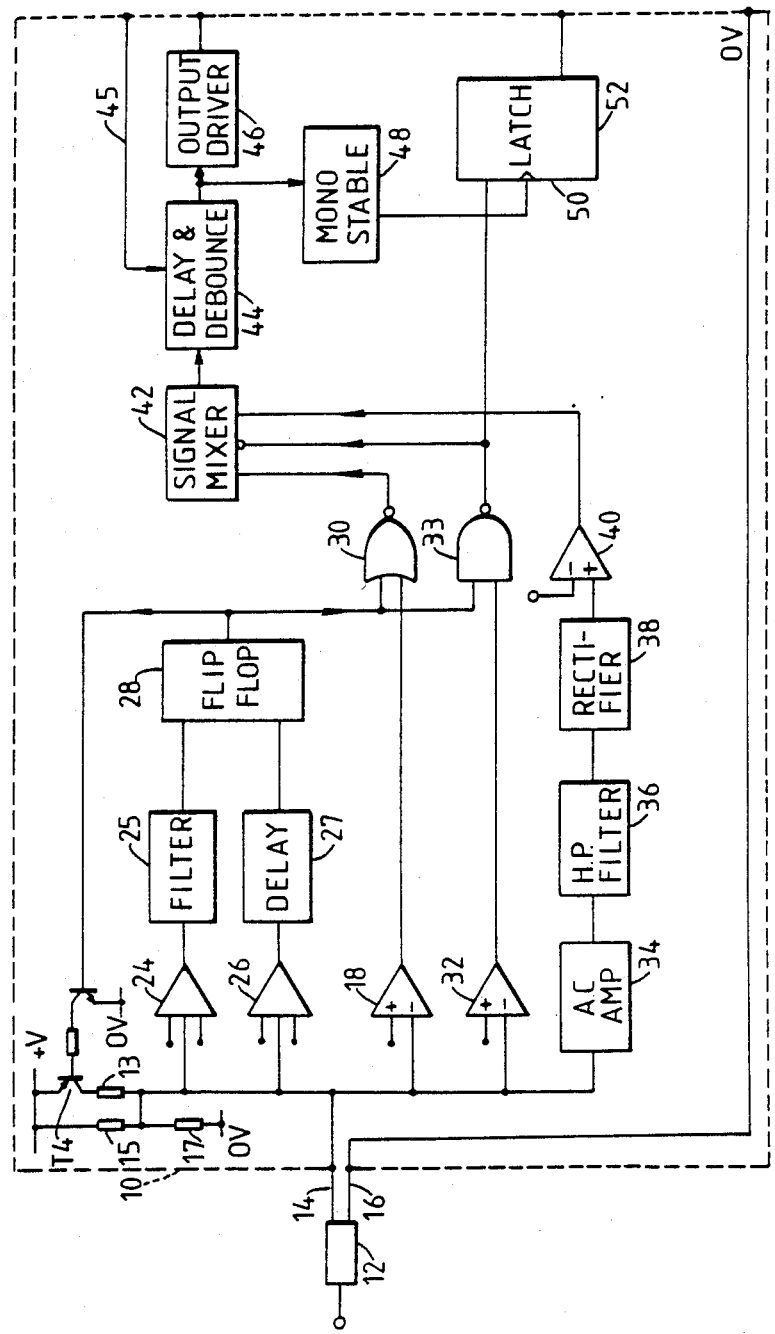
FIG. 1 is a schematic diagram of one signal processing circuit connected to a probe.

Referring firstly to FIG. 1, a signal processing circuit 10 is connected to a probe 12 of the type described in the above co-pending applications. As described in those applications, the probe 12 has both piezo-electric and switching sensors and has only a two wire connection to transmit the signals from the two sensors, namely a signal line 14 and a return line 16. This enables the probe 12 to be interchangeable with more conventional probes having only one type of sensor, e.g. a switching sensor, such as described in U.S. Pat. No. 4,153,998.

The circuit 10 of FIG. 1 is an interface which is intended to be attachable to either the probe 12 or to such a more conventional switching probe. It therefore includes circuitry to determine what type of probe has been attached, and to provide an appropriate power supply.

When a conventional switching probe is connected, a window comparator 24 detects this from the fact that the conventional probe either will be an effective short circuit to ground (if seated in its rest position) giving a very low voltage input to the comparator, or will be an open circuit (if unseated e.g. by contact with a workpiece), giving a very high voltage input. The window comparator 24 resets a flip-flop 28 if input voltages outside the range 4 V to 14 V are detected on the line 14, corresponding to these two conditions (based upon a 15 V supply). This ensures that a transistor T4 is turned off, and the probe is then supplied from a voltage divider formed of resistors 15,17, giving about 12 V when the conventional probe is unseated, and less than 1.5 V when it is seated. A filter 25 prevents the flip-flop being reset by transients outside the range 4 V to 14 V, e.g. from the piezo sensor of the probe 12.

As will be seen below, the probe 12 having the piezo sensor produces a signal of about 2.5 V on the line 14 when supplied from the voltage divider 15,17. Should such a probe 12 be connected in place of the conventional probe, this is detected by a window comparator 26 which reacts to voltages within the range 1.5 V to 4 V to set the flip-flop 28 and turn on the transistor T4. The probe 12 is now supplied through a resistor 13, which has a much lower value than the resistor 15, so that the probe 12 gives voltages well within the range 4 V to 14 V on the line 14. A delay circuit 27 ensures that the flip-flop 28 does not get set during the small time taken for the output of a conventional probe to pass between 1.5 V and 4 V when it switches between low and high levels.

It will be appreciated that the voltage levels quoted above are merely examples to illustrate the principle of operation.

Figure 3:
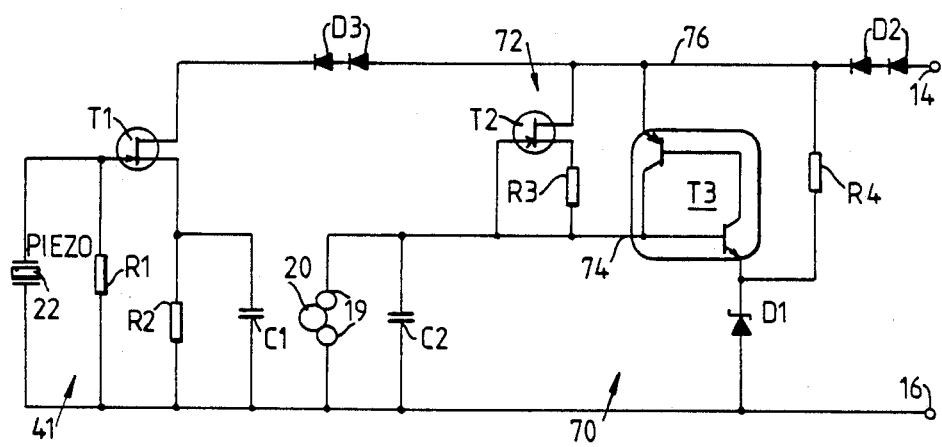
FIG. 3 shows the circuit inside the probe.

Referring to FIG. 3, which shows the circuit of the probe 12 as described in the co-pending applications, the signal from the piezo electric sensor 22 is amplified by an amplifier 41, consisting of a field effect transistor T1, resistors R1,R2 and a capacitor C1. This amplifier is provided in parallel with a detection circuit 70 for detecting the opening of the seat elements 19,20 of the switching sensor. Although FIG. 3 shows only one set of seat elements 19,20, there are in fact three such sets, in series.

The circuit 70 includes a constant current source 72, made up of a field effect transistor T2 and a resistor R3, which normally feeds a constant current through the seat elements 19,20. When the seat elements 19,20 open, however, as a result of contact with a workpiece, this constant current starts to charge a capacitor C2 placed in parallel with the seat elements. The result is a rising ramp voltage at the gate input 74 of a silicon controlled rectifier (SCR) T3. The trigger threshold voltage of the SCR T3 is set by a Zener diode D1 and resistor R4. Assuming the elements 19,20 to be fully opened, the ramp voltage across capacitor C2 will continue to rise until the voltage on the electrode 74 reaches this trigger threshold. In the event of contact bounce, however, the effective reclosing of the seat elements 19,20 during the contact bounce will tend to discharge the capacitor C2. Consequently the trigger threshold will not be reached until the elements 19,20 are fully opened, and the SCR does not react to the contact bounce. This ensures that the probe 12 does not produce contact bounce which might confuse the interface 10 if it is at a similar frequency to the signal from the piezo sensor 22.

When the ramp voltage across capacitor C2 reaches the trigger threshold, the SCR T3 quickly becomes fully conductive, pulling the voltage on a connecting line 76 down to around one volt above the threshold voltage of the Zener diode D1. As mentioned previously, the line 14 to the probe is supplied through a low value resistor 13 in the interface. When the line 76 is pulled down by the SCR T3, the voltage across this resistor 13 in the interface increases, and is easily detected as discussed below. (However, it should be noted that the SCR T3 has the effect of inverting the signal from the seat elements 19,20, compared with a conventional probe).

When the seat elements 19,20 reclose, the gate electrode 74 of the SCR T3 is shorted to ground 16. This causes the SCR to turn off, so that the voltage on line 76 rapidly rises again, signalling that the probe has reseated satisfactorily and is ready for the next measurement.

The AC signal from the piezo sensor 22, coming via the amplifier 41, is also fed along the line 76 to the signal line 14, and is detectable in the interface as discussed below.

A diode pair D2 is provided in the line 76, in series with the detection circuit 70, and a further diode pair D3 is in series with the amplifier 41. These diode pairs adjust the DC levels of these signals to make the present probe 12 easier to distinguish from other, conventional probes which might be connected to the interface. Additionally, the diode pairs prevent accidental current reversal. Moreover, when the transistor T4 in the interface 10 is turned off, the resistor 15 is unable to supply the full quiescent current of the amplifier 41, so that most of the supply voltage is dropped across the resistor 15 and the diodes D2,D3 set the 2.5 V seen on the line 14 in this condition.

One further advantage of the circuit of FIG. 3 is that the charging of the capacitor C2 to the trigger voltage of the SCR T3 will always take a certain minimum length of time (typically ½ to 3 milliseconds). This aids the operation of the circuit described below which gives an indication in the case where the initial contact with the workpiece is so soft that the AC signal from the piezo sensor 22 is not detected, so that the interface reacts only to the opening of the seat elements 19,20. The circuit makes use of the time delay between the piezo signal and the signal from the seats. The inherent time delay caused by the charging of the capacitor C2 will ensure that there is always a certain minimum delay between the two signals, which is easily detected. However, this is not essential, and the circuit below could simply detect the natural time delay between the piezo signal and the seats signal, if desired.

Referring again to FIG. 1, a comparator 18 is provided in the interface 10 to give a low level trigger signal in response to opening of the switch contacts of the conventional switching probe, when one is attached. Opening of these contacts causes the input of the comparator 18 to rise from a very low level to a higher level, as noted above, and the threshold of the comparator 18 is accordingly set at a suitably low level to give the trigger signal as soon as possible. The output of the comparator 18 is fed through a NOR gate 30 to a signal mixer 42 if the flip-flop 28 indicates that the conventional switching probe is attached. However, the gate 30 inhibits the output of the comparator 18 if the probe 12 is attached, since otherwise the comparator 18 would act on the mixer 42 to prevent reliable output from the trigger circuitry described below.

A comparator 32 also receives the input signal from the probe. Its threshold level is arranged to detect the switching of the switching sensor of the probe 12 (which switches between rather higher levels than the conventional switching probe because of its additional internal components). The output of the comparator 32 is taken to an inverting input of the signal mixer 42 via a NAND gate 33, which allows this output to be inhibited if the flip-flop 28 indicates that a conventional probe is connected.

In parallel with this, there is a circuit to detect the output of the piezo-electric sensor of the probe 12. This comprises an A.C. amplifier 34, followed by a high pass filter 36. The pass band of the filter 36 is selected to be compatible with the resonant frequency of the piezo-electric sensor, so that most of the electrical noise generated by that sensor in response to machine and other vibrations can be eliminated.

The output of the filter 36 is rectified by a precision rectifier 38. This ensures correct triggering of the circuit, irrespective of whether the signal produced by the piezo-electric sensor is positive-going or negativegoing. Finally, the rectified signal is fed to a threshold detection comparator 40. The threshold level of this comparator is a low value selected to ensure reliable triggering in response to output signals from the piezo-electric sensor. The resulting signal is taken to the signal mixer 42.

The output of the mixer 42 obviously includes components due to both the piezo-electric and switching sensors of the probe 12, and is taken to a debounce circuit 44. If the piezo-electric signal has been so low that it is not detected, for example because the speed of contact between the probe and the workpiece has been very low, the debounce circuit 44 reacts to the switching signal from the comparator 32, and provides an output through a driver 46. Similarly, if a conventional switching probe has been attached, the circuit 44 debounces the output from the comparator 18. If the circuits 34–40 detect a piezo-electrical signal from the probe 12, the circuit 44 will provide a clean output in response to this, and of course this will happen faster than the output of the switching sensor, giving a more accurate measurement indication. The circuit 44 may have an external input 45 to introduce a delay into the signal and only give an output if the probe is triggered for a certain length of time, corresponding to the delay. This is useful when the probe is being moved at a high speed between measurements, so that the probe is not sensitive to minor vibrations but can still give an emergency stop signal if it accidentally collides with something. It will be appreciated that this delay is inhibited during normal measurement operations. If desired, the input 45 may also be used to inhibit the piezo-electric signal from the comparator 40 during high speed movements.

It is often useful to know, during a normal measurement operation, whether the output signal has been triggered by the piezo-electric sensor or the switching sensor of the probe 12, for example since this gives an indication of the accuracy of the resulting measurement and can enable the computer control to act accordingly, e.g. by repeating the measurement. Such an indication can be provided on a flag line 52.

The output of the debounce circuit 44 is delayed by a monostable 48 and used to clock a latch 50. This clocks into the latch the output of the gate 33, corresponding to the state of the switching sensor of the probe 12 at the time. Of course, if the debounced output was caused by the switching sensor, and not by the piezo, the latch will produce an output on line 52 showing that the switching sensor was triggered at the end of the delay introduced by the monostable 48. Alternatively, if the debounced output was caused by the piezo sensor, the latch output will show that the switching sensor had not yet been triggered. The length of the monostable 48 delay is chosen so as to discriminate between the piezo signal and the signal from the switching sensor, given the existence of a certain minimum time interval between these two signals, as discussed above. The value of the monostable delay should be shorter than this minimum time interval, and should be longer than any remaining contact bounce from the switching sensor that is not removed by the circuit 70 within the probe 12. We have found 200 microseconds to be satisfactory. Of course, the monostable 48 could be omitted if the switching sensor signal is adequately debounced prior to the gate 33, reliance being placed simply on the signal propagation delays of the circuits 42,44 to ensure correctly timed clocking of the latch 50.

Other circuits may be used to produce the flag output 52 by discriminating the time delay between the piezo and the switching sensor signals, if desired. For example, the monostable 48 may be triggered by the output of the piezo signal detector 40, with the latch 50 latching in the output of the switching signal detector 32 as above. This discriminates the time delay in a similar manner to that described above, but relies on the switching sensor signal also being detected by the circuits 34,40, should the piezo signal not be detected.

As mentioned, the circuit of FIG. 1 is intended to received the two-wire input from the probe 12 of the co-pending applications, or alternatively that of a conventional switching probe. Of course, where this dual capability is not required, an interface simply for the probe 12 can be provided by omitting the comparator 18, gate 30, comparators 24,26, flip-flop 28, transistor T4 and associated components. Instead of being a separate interface, such a circuit could if desired be built into or onto the probe 12 itself.

Figure 2:
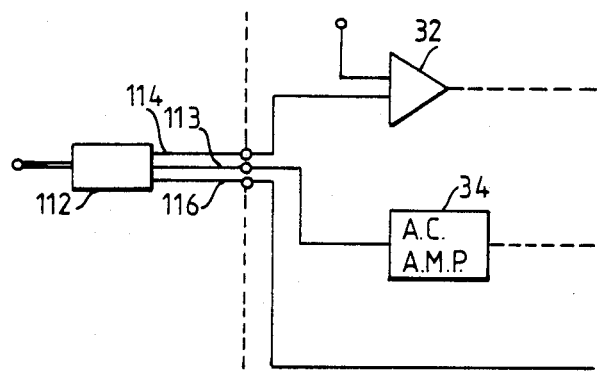
FIG. 2 shows a modification of part of FIG. 1.

Furthermore, since the comparator 40 will react to the switching sensor signal as well as the piezo-electric signal, the comparator 32 (and mixer 42) could be omitted. However, this is not normally preferred, because the comparator 32 is D.C. coupled and therefore gives a continuous indication of whether the switching sensor is seated or unseated. Being A.C. coupled, the circuits 34–40 cannot do this.

Where interchangeability with two-wire probes is not required, the probe may be provided with three (or more) connections to the circuit. This is illustrated in FIG. 2, in which a probe 112 has a line 114 from the switching sensor, a line 113 from the piezo-electric sensor, and a return line 116. The line 114 is taken directly to the comparator 32, and the line 113 is taken directly to the amplifier 34. The rest of the circuits 36–46 (and optionally 48,50) are the same as in FIG. 1.

If desired, the signal mixer 42 can be omitted from the embodiments of either FIG. 1 or FIG. 3. The detected trigger signals from the piezo sensor and from the switching sensor are then taken separately to the apparatus via respective outputs from the interface. A further output 52 is provided to the apparatus from a means for discriminating the first to occur of the two detected trigger signals. This indicates to the apparatus whether the piezo signal occurred before or after the switching sensor signal, and therefore whether the piezo signal is a reliable, accurate indication of workpiece contact.

It will be appreciated that circuits analogous to those described above can be of use with other probes having two sensors. For example, the piezo-electric sensor may be replaced by a capacitative, inductive or piezo-resistive sensor; or if a piezo-electric sensor is used then it need not be in the physical configuration described in co-pending applications.

I claim:

1. A circuit for processing a trigger signal from a workpiece position-sensing probe having first and second sensing means for producing said trigger signal, the circuit comprising:
  first detecting means for detecting a signal produced by the first sensing means, giving a first detection signal;
  second detecting means for detecting a signal produced by the second sensing means, giving a second detection signal;

means for combining the first and second detection signals and producing an output trigger signal on an output line in response to whichever of said detection signals is the first to occur; and means for discriminating which of said first and second detection signals produced the output trigger signal, and providing a further output accordingly.

2. A circuit according to claim 1, wherein the discriminating means comprises means for discriminating a time delay between the detection signals.

3. A circuit according to claim 2, wherein said time delay is discriminated by means for latching the second detection signal upon production of the output trigger signal.

4. A circuit according to claim 3, including means for receiving the output trigger signal and producing a signal therefrom which is delayed by a time value which is shorter than said time delay between the detection signals, and causing the latching means to latch the second detection signal upon production of the delayed signal.

5. A circuit according to claim 1, having only two terminals for connection to the probe, one of the terminals being connected to both of the detecting means.

6. A circuit according to claim 1, including probe determination means for determining which of two probes is connected to the circuit.

7. A circuit according to claim 6, including third detecting means for detecting a signal from an alternative probe, and means for enabling or disabling at least one of the detecting means in accordance with the output of the probe determination means.

8. A circuit according to claim 6, having means for supplying power to a probe when connected to the circuit, including means for varying the power supply in accordance with the output of the probe determination means.

9. A circuit for processing a trigger signal from a workpiece position-sensing probe, the circuit being connectable to a first probe and a second probe which is different from said first probe, the circuit comprising:

first detecting means for detecting a signal produced by the first probe and producing an output in response thereto;

second detecting means for detecting a signal produced by the second probe and producing an output in response thereto;

probe determination means for determining which of the two probes is connected to the circuit; and means for enabling or disabling at least one of the detecting means in accordance with the output of the probe determination means.

10. A circuit according to claim 9, having means for supplying power to a probe when connected to the circuit, including means for varying the power supply in accordance with the output of the probe determination means.

11. A circuit for processing a trigger signal from a workpiece position-sensing probe, the circuit being connectable to a first probe and a second probe which is different from said first probe, the circuit comprising:

detecting means for detecting a signal produced by a said probe and producing an output in response thereto;

probe determination means for determining which of the two probes is connected to the circuit; and means for supplying power to a probe when connected to the circuit, including means for varying the power supply in accordance with the output of the probe determination means.

12. A circuit for processing a trigger signal from a workpiece position-sensing probe having first and second sensing means for producing said trigger signal, the circuit comprising:

first detecting means for detecting a signal produced by the first sensing means, giving a first detection signal;

second detecting means for detecting a signal produced by the second sensing means, giving a second detection signal;

means for producing at least one output trigger signal on an output line and in response to said detection signals; and means for discriminating the first to occur of said first and second detection signals, and providing a further output accordingly.

* * * * *